(12) United States Patent
     Diamond

(10) Patent No.: US 10,758,328 B2
(45) Date of Patent: Sep. 1, 2020

(54) TOOTHBRUSH

(71) Applicant: GlaxoSmithKline Consumer Healthcare (UK) IP Limited, Brentford, Middlesex (GB)

(72) Inventor: David Diamond, Dublin (IE)

(73) Assignee: GlaxoSmithKline Consumer Healthcare (UK) IP Limited (GB)

( * ) Notice: Subject to any disclaimer, the term of this patent is extended or adjusted under 35 U.S.C. 154(b) by 6 days.

(21) Appl. No.: 15/565,248

(22) PCT Filed: Apr. 15, 2016

(86) PCT No.: PCT/EP2016/058444
     § 371 (c)(1),
     (2) Date: Oct. 9, 2017

(87) PCT Pub. No.: WO2016/166342
     PCT Pub. Date: Oct. 20, 2016

(65) Prior Publication Data
     US 2018/0078351 A1    Mar. 22, 2018

(30) Foreign Application Priority Data

Apr. 15, 2015  (IE) .................................. S2015/0104

(51) Int. Cl.
     *A61C 17/26*    (2006.01)
     *A46B 9/04*     (2006.01)
     *A61C 17/34*    (2006.01)
     *A46B 9/02*     (2006.01)
     *A61C 17/22*    (2006.01)

(52) U.S. Cl.
     CPC .......... *A61C 17/3436* (2013.01); *A46B 9/026* (2013.01); *A46B 9/04* (2013.01); *A61C 17/222* (2013.01); *A46B 2200/1066* (2013.01)

(58) Field of Classification Search
     CPC ..... A61C 17/26; A46B 13/02; A46B 15/0004; A46B 9/04
     See application file for complete search history.

(56) References Cited

U.S. PATENT DOCUMENTS

| 2,878,501 | A | * | 3/1959 | Brennan | ................. | A44B 19/14 |
| | | | | | | 15/164 |
| 3,903,906 | A | * | 9/1975 | Collis | .................... | A46B 9/045 |
| | | | | | | 132/200 |
| 4,317,463 | A | * | 3/1982 | Massetti | .................. | A46B 7/04 |
| | | | | | | 15/167.1 |
| 5,511,274 | A | * | 4/1996 | Lewis, Jr. | ................ | A46B 5/06 |
| | | | | | | 15/159.1 |

(Continued)

FOREIGN PATENT DOCUMENTS

| CN | 87203086 U | 1/1988 |
| CN | 1642495 A | 7/2005 |

(Continued)

*Primary Examiner* — Michael D Jennings
(74) *Attorney, Agent, or Firm* — Roshni A. Sitapara; Joshua C. Sanders

(57) ABSTRACT

The present invention is concerned with a toothbrush, in particular an electric or otherwise driven toothbrush having a rotatable head, wherein the head incorporates arrays of bristle tufts, at least some of which extend substantially radially of the axis of rotation.

13 Claims, 1 Drawing Sheet

(56) References Cited

U.S. PATENT DOCUMENTS

| | | | | |
|---|---|---|---|---|
| 5,755,242 A | * | 5/1998 | Denebeim | A45D 1/04 |
| | | | | 132/232 |
| 5,878,459 A | * | 3/1999 | McParland | A46B 5/0054 |
| | | | | 15/114 |
| 6,148,466 A | * | 11/2000 | Smitelli, III | A46B 9/02 |
| | | | | 15/1.7 |
| 6,154,913 A | * | 12/2000 | Burton | A47K 11/10 |
| | | | | 15/104.2 |
| 6,460,215 B1 | * | 10/2002 | Dues | A46B 3/20 |
| | | | | 15/104.16 |
| 9,113,758 B1 | * | 8/2015 | O'Brien | A47K 11/10 |
| 2004/0200748 A1 | | 10/2004 | Klassen et al. | |
| 2010/0132140 A1 | * | 6/2010 | Diamond | A61C 17/222 |
| | | | | 15/22.1 |
| 2013/0055515 A1 | * | 3/2013 | Diamond | A46B 9/04 |
| | | | | 15/28 |
| 2014/0173839 A1 | | 6/2014 | Henderson | |
| 2014/0310896 A1 | * | 10/2014 | Pender | A46B 13/04 |
| | | | | 15/22.1 |

FOREIGN PATENT DOCUMENTS

| | | | |
|---|---|---|---|
| CN | 1852686 A | 10/2006 | |
| CN | 101617891 A | 1/2010 | |
| CN | 101873838 A | 10/2010 | |
| DE | 8713194 U1 | 11/1987 | |
| JP | 5721036 B1 | 5/2015 | |
| WO | 2014178206 A1 | 11/2014 | |

\* cited by examiner

TOOTHBRUSH

This application is a 371-national phase entry of International Application No. PCT/EP2016/058444, filed 15 Apr. 2016, which claims the priority of IE S2015/0104 filed 15 Apr. 2015.

FIELD OF THE INVENTION

This invention relates to an improved toothbrush, and in particular an electric or otherwise powered toothbrush which is adapted to provide improved cleaning of the area of the teeth about the gum line, which is generally inadequately cleaned by conventional toothbrushes.

BACKGROUND OF THE INVENTION

Dental hygiene is an extremely important undertaking in order to keep teeth clean and prevent dental problems or complications, for example cavities, bad breath, gingivitis and gum disease. It is well established that your teeth should be brushed at least twice a day, and preferably professionally cleaned twice a year. However the majority of people, when practising oral hygiene, tend to concentrate on cleaning the surfaces of the teeth, and less commonly between the teeth by means of flossing. The large majority of people tend to overlook cleaning above the gum line, known as supra-gingival cleaning, in addition to cleaning just below the gum line, known as sub-gingival cleaning.

The small crevice or channel which forms the interface between the gums and the teeth, known as the sub-gingival margin or sulcus, is a natural location at which plaque deposits form, and is relatively difficult to clean effectively. As a result plaque deposits can build along the gum line over time, and are often characterised by a darkening of the area The above sub-gingival cleaning is one of the most important aspects of dental hygiene, as sub-gingival plaque and calculus is one of the major causes of periodontal disease. Conventional toothbrushes are however ill equipped and designed to facilitate such gingival or sub-gingival cleaning. The design of conventional toothbrushes require, as a result of their bristle tuft configuration, to be presented at an angle of approximately 45° to the surface of the teeth in order to gain entry to the sub-gingival area. In addition these conventional toothbrushes have a tendency to lift the free gingival excessively and may therefore result in long-term gum detachment complications.

It is therefore an object of the present invention to overcome the above mentioned problems of the prior art.

SUMMARY OF THE INVENTION

According to the present invention there is provide a toothbrush comprising a head rotatable about an axis of rotation; and at least one circular array of cleaning elements disposed substantially concentrically of the axis of rotation, at least some of the cleaning elements extending radially with respect to the axis of rotation.

Preferably, the head comprises a plurality of circular arrays of cleaning elements disposed substantially parallel to one another.

Preferably, adjacent circular arrays are spaced from one another by a circumferentially extending gap.

Preferably, each array of cleaning elements has a reduced radius with respect to an adjacent array.

Preferably, the head comprises at least one cleaning element which extends substantially parallel to the axis of rotation.

Preferably, the at least one cleaning element extends co-axially of the axis of rotation.

Preferably, the head comprises at least one array in which the cleaning elements are inclined to the axis of rotation.

Preferably, at least some of the cleaning elements comprise one or more tufts of bristles.

Preferably, the head is substantially hemispherical.

Preferably, the head comprises a substantially hemispherical body from which the cleaning elements extend.

Preferably, at least some of the cleaning elements extend substantially perpendicular to that portion of the body from which the respective cleaning element extends.

Preferably, the toothbrush comprises drive means operable to effect rotation of the head about the axis of rotation.

Preferably, the toothbrush comprises a base to which the head is mounted and rotatable relative to.

Preferably, the base comprises a bearing which facilitates rotation of the head about the axis of rotation.

Preferably, the head is operable to rotate in a first direction about the axis of rotation and in a second direction opposite to the first direction.

As used herein, the term "cleaning element" is intended to mean a component or collection of components which are adapted to effect a mechanical cleaning action by means of scrubbing or abrading a surface to be cleaned, the elements preferably being elongate in one dimension and resiliently deformable, and may take the form of a bristles or similar bunches or tufts of fibres, strands, filaments or the like.

BRIEF DESCRIPTION OF THE DRAWINGS

An embodiment of the present invention will now be described with reference to the accompanying drawings, in which.

DETAILED DESCRIPTION OF THE DRAWINGS

Figure 1:
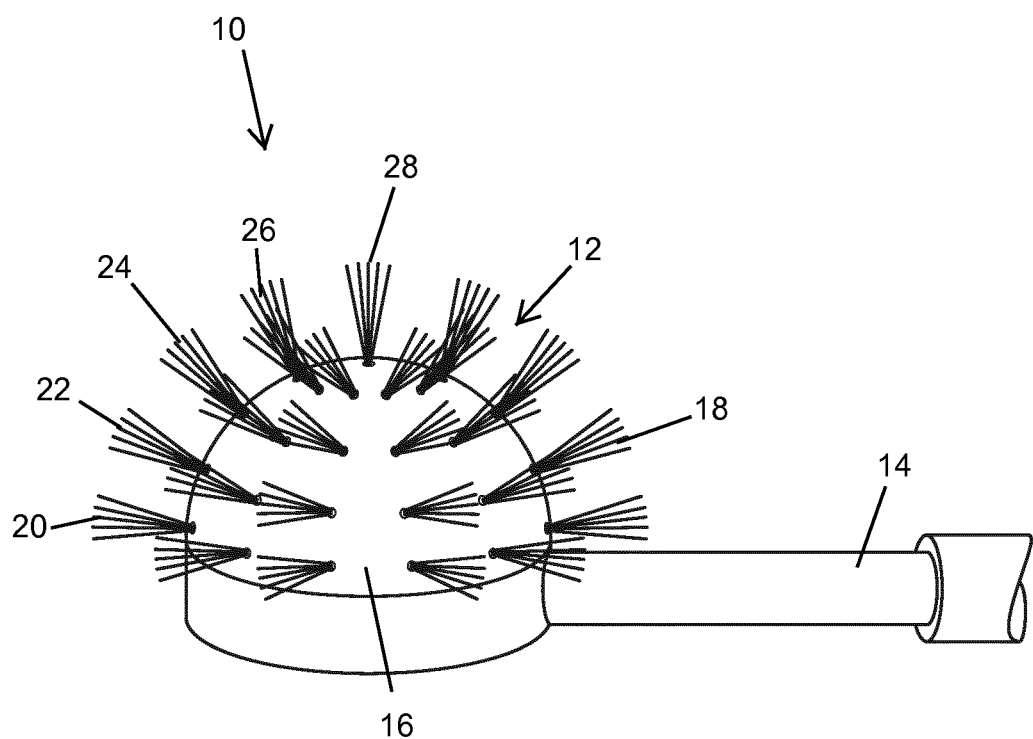
FIG. 1 illustrates a perspective view of an improved toothbrush according to an embodiment of the present invention.

Referring now to the accompanying drawings there is illustrated a toothbrush, generally indicated as (10), for particular use in effective cleaning of the gum line or interface between the teeth and gums, also known as the sub-gingival area.

The brush (10) comprises a head (12) mounted to a substantially conventional handle (14) which terminates in a base (15) which, in the embodiment illustrated, is circular in shape and dimensioned to received the head (12) thereon, having substantially the same diameter as the end of the head (12) so as not to extend beyond the widest point of the head (12). The head (12) is arranged, as described hereinafter, to be rotatable on the base (15) about an axis of rotation AA which extends substantially perpendicularly from a centre of the base (15). It will however be appreciated from the following description of the operation of the brush (10) that any other functional alternative to this arrangement may be employed once the head (12) can be rotated about an axis.

In order to effect this rotation the handle (14) preferably houses or is connected to drive means (not shown) for example in for the form of an electric motor or the like. The handle (14) will thus also preferably contain a transducer (not shown) to transfer drive from the drive means to the head (12), as described in greater detail hereinafter, in addition to a power supply (not shown) such as a rechargeable battery (not shown) or the like, as is conventionally found in existing electric toothbrushes. As these components and their operation are well known in the art no further detail is deemed necessary concerning the configuration and operation of same, including any necessary circuitry and control means required to ensure the correct operation of the drive means, battery, etc.

The head (12) comprises a body (16) defining a three dimensional curved surface, preferably but not exclusively a substantially hemispherical or dome shaped surface, secured to and projecting outwardly from which are arrays of cleaning elements in the form of bristles (18), although any other suitable alternative may be employed once embodying the requisite cleaning functionality. The bristles (18) are arranged in a particular pattern in order to facilitate effective cleaning of the sub-gingival region, as set out hereinafter. The bristles (18) may be formed of any suitable material, and may be varied in size, shape and stiffness in order to suit the intended application. The bristles (18) may be secured to the body (16) by any suitable means, for example by adhering or otherwise affixing the bristles (18) into corresponding blind holes (not shown) provided in the body (16).

Referring in particular to FIG. 1 it can be seen that the bristles (18) are provided in a plurality of substantially parallel circular arrays, each array preferably comprising a plurality of discreet tufts of bristles (18) spaced from one another. It will however be appreciated that the bristles (18) could be provided as a continuous ring in each of the circular arrays. The bristles (18) or tufts of bristles (18) project radially outwardly from the body (16) and are oriented to extend substantially perpendicularly to the local portion of the body (16) from which the respective bristles (18) extend. The arrays of bristles (18) reduce in diameter as they progress away from the widest point of the hemispherical body, and in the embodiment illustrated comprise a first circular array (20) of bristles (18) having the greatest array diameter, a second circular array (22) having a slightly lesser array diameter, a third array (24) of bristles (18) having a further reduced array diameter, a fourth array (26) of bristles (18) having a further reduced array diameter, the bristles (18) terminating in an apex tuft (28). The bristles (18) in the apex tuft (28) extend from a point on the surface of the body 16 which lies on the axis of rotation AA of the head (12) and so in use are substantially co-axial with the axis of rotation AA.

Figure 2:
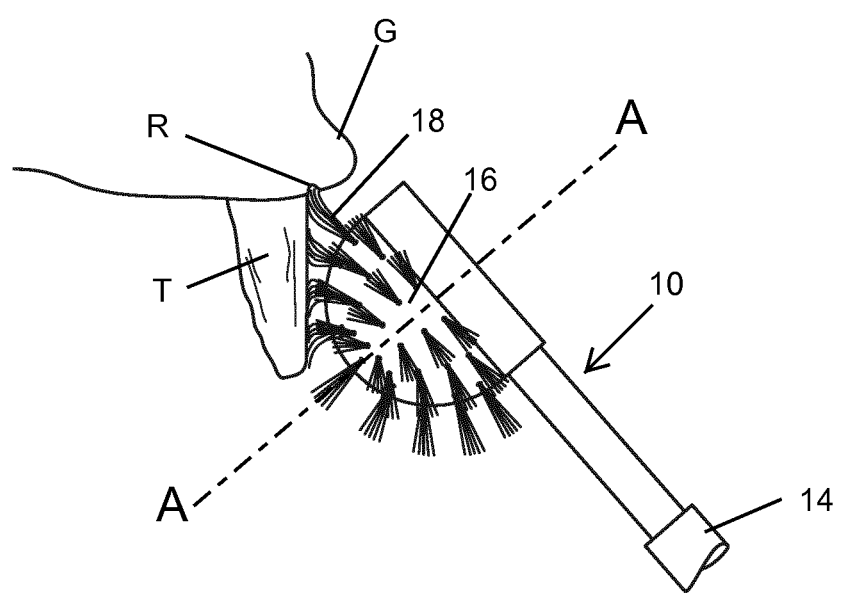
FIG. 2 illustrates a perspective view of the toothbrush illustrated in FIG. 1 being used to effect brushing of an area of the teeth at the gum line.

It will therefore be appreciated that when the head (12) is rotated by the drive means each array (20), (22), (24) and (26) of bristles (18) presents a slender line of bristles (18) which is perfectly suited to entering and cleaning the sub-gingival margin or sulcus (R), for example as illustrated in FIG. 2, at the interface between the gums (G) and teeth (T). Conventional toothbrushes which enter this area, due to their bristle tuft configuration, must be presented at an angle of 45° to gain entry and again due to their bristle tuft configuration can give rise to lifting of the free gingival and thus long-term gum detachment problems. The angle at which the head (12) is presented to the teeth (T) in order to gain access to the sub-gingival margin (R) is not critical and the bristles (18) will gain access from a wide range of angles and without excessively lifting the free gingival.

At the same time as the sub-gingival margin (R) is being cleaned, preferably by the first array (20) of bristles (18) the second, third and fourth arrays (22), (24), (26) will clean the interdental space and the proximate surfaces of the bristles (18) make effective contact with the teeth (T) on each side of the interdental space.

The apex (28) bristles (18) provide a leading point which is ideal for accessing the area between teeth, particularly at the base of the teeth.

It should be understood that the body (16) serves purely as a means of securing and retaining the bristles (18) in the various arrays (20), (22), (24), (26) and the central or apex (28) bristles (18), and thus the body (16) could be replaced with any other suitable functional alternative. Furthermore it will be understood that in order to facilitate cleaning of the sub-gingival margin (R) it is only necessary to have a single array of bristles (18) which are arranged to project radially beyond the outermost dimension of the body (16) and base (15) in order to facilitate unimpeded engagement of the rotating bristles (18) into the sub-gingival margin (R).

It will thus be appreciated that the toothbrush (10) of the present invention provides a simple and efficient means of effectively and easily cleaning the sub-gingival margin (R), but which is also adapted to operate as a fully functional toothbrush for cleaning the entire range of teeth and the interdental spaces.

The invention claimed is:

1. A toothbrush comprising:
a hemispherical head rotatable about an axis of rotation provided on a handle; said axis projecting substantially perpendicular to a longitudinal axis of the handle at
a base formed by the handle, wherein the base provides support for the head, wherein the base has an axis of symmetry coincidental with the axis of rotation, and wherein the base comprises a bearing which facilitates rotation of the head about the axis of rotation; and
at least one circular array of cleaning elements provided on the head and disposed substantially concentrically of the axis of rotation, such that the toothbrush presents a substantially hemispherical rotatable array of cleaning elements on the base.

2. A toothbrush according to claim 1 in which the head comprises a plurality of circular arrays of cleaning elements disposed substantially parallel to one another.

3. A toothbrush according to claim 2 in which adjacent circular arrays are spaced from one another by a circumferentially extending gap.

4. A toothbrush according to claim 2 in which each array of cleaning elements has a reduced radius with respect to an adjacent array.

5. A toothbrush according to claim 1 in which the head comprises at least one cleaning element which extends substantially parallel to the axis of rotation.

6. A toothbrush according to claim 1 in which the at least one cleaning element extends co-axially of the axis of rotation.

7. A toothbrush according to claim 1 in which the head comprises at least one array in which the cleaning elements are inclined to the axis of rotation.

8. A toothbrush according to claim 1 in which at least some of the cleaning elements comprise one or more tufts of bristles.

9. A toothbrush according to claim 1 in which the head is substantially hemispherical.

10. A toothbrush according to claim 1 in which at least some of the cleaning elements extend substantially perpendicular to that portion of the body from which the respective cleaning element extends.

11. A toothbrush according to claim 1 comprising drive means operable to effect rotation of the head about the axis of rotation.

12. A toothbrush according to claim 1 wherein the handle comprises a base to which the head is mounted and rotatable relative to.

13. A toothbrush according to claim 1 in which the head is operable to rotate in a first direction about the axis of rotation and in a second direction opposite to the first direction.

* * * * *